United States Patent
Masberg et al.

[11] Patent Number: 5,939,793
[45] Date of Patent: Aug. 17, 1999

[54] STARTER FOR DRIVE UNITS, ESPECIALLY INTERNAL COMBUSTION ENGINES, AND PROCESS FOR OPERATING THE SAME

[75] Inventors: Ullrich Masberg, Rosrath; Klaus-Peter Zeyen, Cologne, both of Germany

[73] Assignee: ISAD Electronic Systems GmbH & Co. KG, Germany

[21] Appl. No.: 08/704,500

[22] PCT Filed: Feb. 24, 1995

[86] PCT No.: PCT/EP95/00681

§ 371 Date: Nov. 12, 1996

§ 102(e) Date: Nov. 12, 1996

[87] PCT Pub. No.: WO95/23287

PCT Pub. Date: Aug. 31, 1995

[30] Foreign Application Priority Data

Feb. 28, 1994 [DE] Germany .............................. 44 06 481

[51] Int. Cl.$^6$ .................................................. F02N 11/00
[52] U.S. Cl. .............................. 290/38 R; 74/6; 310/268
[58] Field of Search ................................. 290/38, 31, 32, 290/36 R, 37 R, 38 B, 46, 38 R; 318/135; 310/268, 98, 105, 109; 74/6

[56] References Cited

U.S. PATENT DOCUMENTS

| | | | |
|---|---|---|---|
| 4,405,031 | 9/1983 | Rotter | 180/165 |
| 5,002,020 | 3/1991 | Kos | 123/46 E |
| 5,081,365 | 1/1992 | Field et al. | 290/45 |
| 5,140,868 | 8/1992 | Mizuno et al. | 74/574 |
| 5,495,127 | 2/1996 | Aota et al. | 290/31 |

FOREIGN PATENT DOCUMENTS

| | | |
|---|---|---|
| 0 017 724 A1 | 10/1980 | European Pat. Off. . |
| 0 033 191 A2 | 8/1981 | European Pat. Off. . |
| 0 544 576 A1 | 6/1993 | European Pat. Off. . |
| 0 604 979 A2 | 7/1994 | European Pat. Off. . |
| 0151935 | 1/1997 | European Pat. Off. . |
| 2102400 | 4/1972 | France . |
| 2140904 | 1/1973 | France . |
| 2707702 | 1/1995 | France . |
| 21 23 831 B2 | 10/1975 | Germany . |
| 22 28 516 B2 | 1/1976 | Germany . |
| 30 05 561 A1 | 8/1980 | Germany . |
| 32 30 607 A1 | 2/1984 | Germany . |
| 37 37 192 A1 | 7/1988 | Germany . |
| 41 00 937 A1 | 8/1991 | Germany . |
| 49-64805 | 6/1974 | Japan . |
| 55-1431 | 1/1980 | Japan . |
| 55-5454 | 1/1980 | Japan . |
| 56-4625 | 1/1981 | Japan . |
| 57-043577 | 3/1982 | Japan . |
| 57-43577 | 3/1982 | Japan . |
| 58-126434 | 7/1983 | Japan . |
| 61-135937 | 6/1986 | Japan . |
| 61-154460 | 7/1986 | Japan . |
| 61-200333 | 9/1986 | Japan . |
| 62-171460 | 7/1987 | Japan . |
| 62-255534 | 11/1987 | Japan . |
| 2-3528 | 1/1990 | Japan . |
| 2-216323 | 8/1990 | Japan . |
| 4316760 | 11/1992 | Japan . |
| WO 90/01126 | 2/1990 | WIPO . |
| WO 92/07411 | 4/1992 | WIPO . |

OTHER PUBLICATIONS

Examination Report of Japanese patent application No. 522138, dated Mar. 24, 1998 (w/English translation (3pgs.).

*Primary Examiner*—Nestor Ramirez
*Assistant Examiner*—Nicholas Ponomarenko
*Attorney, Agent, or Firm*—Leydig, Voit & Mayer, Ltd.

[57] ABSTRACT

A starter for a drive unit, such as an internal combustion engine, includes a stationary and a movable base element which form a linear motor. The movable base element is seated on a revolving shaft of the drive unit an inertia mass of a flywheel of the drive unit. The inertia mass of the flywheel is rigidly connected with the revolving shaft and is acted upon with sufficient torque required for the starting of the drive unit. Upon starting, the linear motor is switched over into a generator operation.

10 Claims, 2 Drawing Sheets

STARTER FOR DRIVE UNITS, ESPECIALLY INTERNAL COMBUSTION ENGINES, AND PROCESS FOR OPERATING THE SAME

FIELD OF THE INVENTION

The invention relates to a starter for drive units, especially internal combustion engines, with a stationary base element and a movable base element—seated on a revolving shaft of the drive unit—of a linear motor as well as with a process for the operation of such a starter.

BACKGROUND OF THE INVENTION

Many drive units such as internal combustion engines in motor vehicles cannot start from their own force. They must first be started by an external power source, the starter, and be brought up to the motor turning rate required for the starting. Only after this can they continue to run on their own power. This required, depending on motor type, stroke volume, bearing friction, etc., a differently great starting torque which must be provided by the starter. This operates, ordinarily over a gear, on a massive inertia mass or a flywheel, which is seated on a shaft of the drive unit—in the case of motor vehicles the crankshaft.

It is a known practice to use a battery-fed direct-current motor as a starter in motor vehicles, which, over a drive pinion, transmits the necessary torque onto the flywheel. Typically, in a direct-current series motor, i.e., an electric direct-current motor, an exciter or stator winding is switched in series with an armature winding. In order to start, the drive pinion of the series motor—under action of a magnetic switch-controlled engaging lever—is brought into engagement with a gear rim seated on the periphery of the flywheel disk. After starting, this connection is again interrupted. A freewheel coupling is arranged between the armature of the series motor and the drive pinion, which is constructed as an overload protection. It is to prevent the possibility that the armature, in the starting of the internal combustion engine, will be driven with an undesirably high turning rate. In other known starters, a rather sophisticated meshing gear provides the mechanical connection between the armature of the series motor and the gear rim of the flywheel in order to facilitate the "meshing" of the pinion into the gear rim.

Accordingly, these known starters are an expensive component that is subject to frequent repair. Also the flywheel is an expensive component since its circumference is provided with the gear rim for engagement with the starter pinion and, otherwise, with makings for the control of the ignition processes in the motor.

It is also a known practice to allocate to the flywheel a noise-reducing rotary vibration eradicator, in order already in this place to combat rotary vibrations. For this, reference is made, for example to EP 0 250 913 A2 or DE 89 07 426.2 U1.

Furthermore, for the state of the art reference is made to the following publications: DE 34 08 311 A1 concerns itself with an electric machine—seated on the crankshaft of a piston motor—in which an inertia mass is seated on a crankshaft and on its circumferential surface is equipped with a toroid winding. Fundamentally comparable with this is the electric machine according to DE 33 01 245 A1. DE 37 37 192 A1 discloses an electric machine in motor vehicle, the rotor of which—over a first coupling with the crankshaft of an internal combustion engine as well as, over a second coupling, with the input shaft of a gear—forms the inertia mass for the driving of the crankshaft. Finally, DE 39 26 054 A1 discloses an electric starter motor for starting an inertia wheel seated on a crankshaft, in which system the inertia wheel is constructed as rotor of a reluctance motor.

DE 21 23 831 B2 concerns a linear motor for the starting of an internal combustion machine, the rotor of which is rigidly joined with a crankshaft of the internal-combustion machine. In addition to the rotor of the linear motor, however, an inertia disk for the starting of the internal-combustion machine is coupled with the crankshaft. DE 22 28 516 B2 is a patent of addition to DE 21 23 831 B2.

Further, EP-A-0 103 821 relates to a sector-form reluctance linear motor, the rotor of which, i.e., its moved base element, is a flywheel of a motor vehicle internal combustion engine. The reluctance linear motor is suited for the starting of the internal combustion engine for the indirect starting by acceleration of the flywheel uncoupled from the internal combustion engine, which wheel is coupled in after reaching a sufficient turning rate for the starting, only by an additional coupling.

Finally, DE 23 16 679 B2 deals with linear motors for the drive of rail-bound vehicles; and from DE 40 27 706, further, there is known a contactless electric drive for wheel-bound vehicles over a drive.

Electric motors such as linear motors utilize the principle of electromagnetic induction, i.e., the Lorentz forces. They operate with the following construction: a stationary base element called ("stator") and a movable base element ("rotor"). These elements are spatially and physically separated by a gap, such as an air gap. They, however, are linked to one another by a common magnetic flux passing through the gap. A first base element generates a traveling magnetic primary field, primarily with the use of one or more exciter. A second base element is equipped with one or more electric conductors. The primary field of the first base element permeates over the gap the second base element. A driving force, i.e., the Lorentz force, is generated through linkage with the induced electromagnetic field. The exciter windings may be arranged on the stator or on the rotor without affecting the function of the electric motor.

SUMMARY OF THE INVENTION

According to the present invention, a drive unit includes an inertia mass or a flywheel seated on a rotating shaft. The flywheel is arranged as a movable base element or rotor of a linear motor. A stationary base element or stator of the linear motor is disposed in spaced relation from the movable base element and is separated therefrom by an air gap. The operation of the motor is controlled by a control circuit. In a first mode, the linear motor is operated to exert a starting torque on the rotating shaft. In a second mode, the linear motor is used as generator so that current is drawn from the linear motor.

The inertia mass/flywheel is thus part of the starter motor itself. The transfer of starting torque to the inertia mass/flywheel takes place through an electromagnetic coupling between the rotor and the stator of the linear motor.

The invention yields several advantages. For example, the starter according to the invention is of compact and simple construction. It is constructed "around the flywheel." In addition, the weight and the dimensions in the motor zone of a motor vehicle are significantly reduced. Known components such as a starter unit, with its rotor, transmission gear, and its pinion, are superfluous. Furthermore, fabrication and machining of the toothed rim of the flywheel are eliminated, so that the flywheel can be made more simply with reduced manufacturing expenditure. Conventional mechanical "gear-wise" transmission of the starting moment onto the flywheel is likewise eliminated. It is replaced by a magnetic coupling engaging between flywheel and stator.

In another aspect of the invention, a method of starting and operating an internal combustion engine includes a rotor section for a linear electric machine disposed on the drive shaft, a stator section of the linear electric machine separated from the rotor section by an air gap, and a control section adapted to provide signals to the stator section. The method proceeds by applying first control signals to the stator section to induce a traveling magnetic field that links the stator section with the rotor section to apply a torque to the drive shaft that is sufficient to initiate a starting operation. After the engine is started, the linear electric machine is operated to draw current from the linear electric machine. The method thus eliminates the requirement for contacting parts since requisite starting torque is provided by electromagnetic field forces. Furthermore, aside from the flywheel, there are no additional moving parts. The starter, therefore, is subject to low wear.

DETAILED DESCRIPTION OF THE PREFERRED EMBODIMENTS

Generally, the invention relates to the use of a linear motor as a starter in an internal combustion engine or the like. The use of an electric motor as a starter—whether a direct-current, an alternating-current, or a three-phase current motor—must transfer a sufficiently great starting torque onto its rotor, here the inertia mass or the flywheel of the drive unit. The choice of the particular electric motor is governed according to the type of the drive unit. It has been found that for internal combustion engines there are especially well suited types that provide a great starting torque and achieve a sufficiently high turning rate. Surprisingly advantageous is a rotating electric motor operating according to the linear principle.

The linear motor may be conceptualized as a special form of the induction motor with short-circuit rotor, such as an asynchronous motor. Instead of the rotary field known, say, from such asynchonous motors, the exciter windings of a linear motor according to the invention form a pure traveling electromagnetic field. The traveling field generated by the stator (or rotor) passes through the rotor (or stator) and induces therein annular or turbulent currents, the magnetic fields of which are linked with the field and, as a result, exert the desired thrust force. According to the invention, the flywheel of a drive unit is the rotor of such a linear motor.

Figure 1:
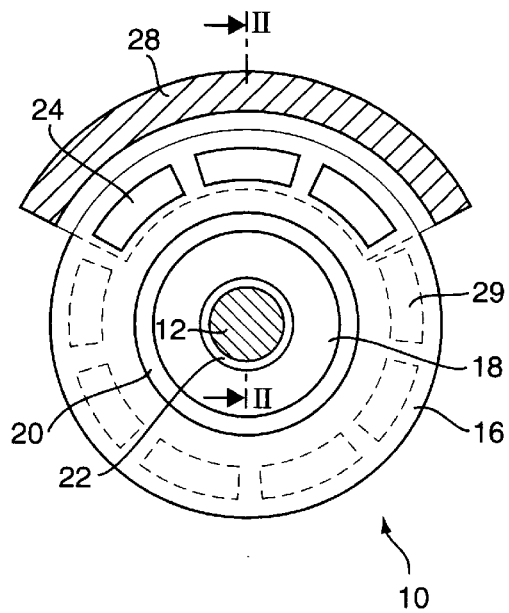
FIG. 1 shows a side view of a preferred example of execution of a starter according to the invention.
Figure 2:
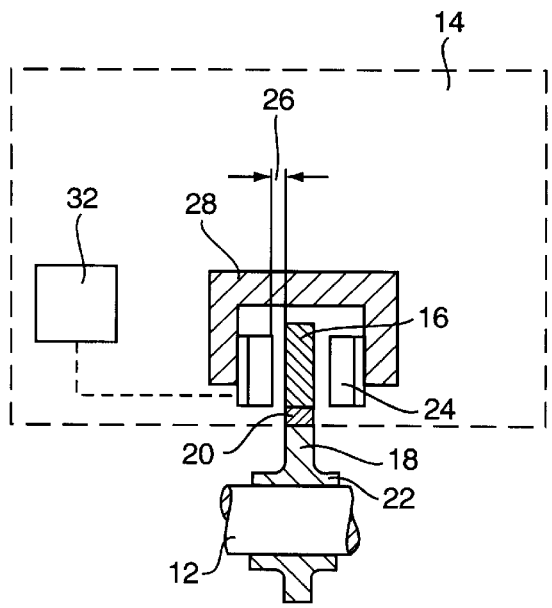
FIG. 2 is a vertical section along the line II—II in FIG. 1.

FIGS. 1 and 2 show a linear motor 14 utilized as a starter for a drive unit (shown schematically). The following detailed description, in the interest of providing a simple representation, is limited to a drive unit in the form of a motor vehicle internal combustion engine. It should be understood, however, that the invention is not restricted to the particular drive unit described.

The starter has a disk-type flywheel 10, which is seated on a drive/off-drive shaft of an internal combustion engine. This is shown in FIGS. 1 and 2 as a crankshaft 12. The flywheel 10 is acted upon with the torque required for starting the internal combustion engine. It is constructed as a movable base element or rotor of a linear motor 14. As explained below, a stationary base element is also provided and, in conjunction with the movable base element, forms a linear electric motor.

The transfer of the starting torque onto the flywheel then takes place over an electromagnetic coupling between the flywheel 14 and the stationary base element of the linear motor.

The flywheel 10 includes an outer rotating ring 16 and an inner rotating ring 18 concentric thereto. The outer and inner rotating rings 16 and 18 are joined elastically by an annular rubber layer or ring 20. The inner rotating ring 18 interfits with a hub 22, which is seated firmly on the crankshaft 12. In this manner the flywheel 10 forms a rotary vibration eradicator which passively counteracts interfering rotary irregularities of the crankshaft 12, and thus effectively reduces noises accompanying these vibrations already in their onset.

The invention thus makes it possible to construct the flywheel 10 as a passive rotary vibration eradicator, or to arrange such an eradicator parallel thereto. In a preferred variant, the flywheel 10 is constructed from concentrically arranged inner and outer rotating rings. The rotating rings are joined rotary-elastically by the rubber layer 20. In this manner the invention offers the possibility of using the starter simultaneously for the damping of interference vibrations of a rotating shaft without additional components or cost.

FIGS. 1 and 2 also show the stationary base element of the linear motor. Three stator coils denoted by numeral 24 are arranged on both sides of the outer rotating ring 16 opposite one another in each case. The stator coils 24 are uniformly distributed within a segment-type angular section of the flywheel 10. The stator coils 24 are slightly spaced from the outer rotating ring 16 to provide an air gap 26. The air gap 26 is chosen to be as narrow as possible—on the order of 0.1 and 1.5 mm. Accordingly, a high coupling efficiency is achieved when the gap 26 between the flywheel ring 16 and the stator coils 24 is relatively small.

As shown in FIG. 2, the stator coils 24 are borne by a stationary holding yoke 28 that partially flanks the opposed sides of the flywheel in the manner of a yoke. Preferably the holding yoke 28 is also turnably borne on the crankshaft 12 (not shown in the drawing). In this way, the stator coils 24 and the flywheel 10 vibrate in common in response to jarrings or vibrations of the motor vehicle. The mutual alignment between the stator coils 24 and the flywheel and the gap 26 therefore remains substantially constant.

The invention provides an especially simple linear motor including the exciter coils 24 disposed to generate the traveling electromagnetic field. The stator coils may be arranged on only one side of the flywheel, preferably only within a certain segment-type angular range of the flywheel. However, rising demands on the required starting torque may dictate a concomitant increase in the span of the coil 24 up to until it reaches the full circumference of the flywheel, i.e., 360°. In this arrangement, the coils 24 can be distributed equally or unequally on the one side of the flywheel. Alternatively and/or in addition, coils 24 can be arranged on both sides of the flywheel as shown in FIG. 2. This arrangement provides an increased starting torque. The exciter system and its several stator coils therefore can be distributed either on one or both sides of the flywheeel within certain angular ranges, or over the entire circumference—equally or unequally. In this way, the linear motor can be appropriately configured rather simply for different performance ranges.

The stator coils 24 are energized in a known manner by receipt of a firmly laid current feed (not shown in the drawing) with alternating currents phase-displaced with respect to one another. They generate a magnetic traveling field, which engages over the gap 26, traverses the outer rotating ring 16, induces an electric field closed annularly in itself therein and therewith induces an annular voltage. By reason of this voltage there flow in the rotating ring 16 annular or eddy currents. These the magnetic fields are linked with the traveling field of the stator coils 24 and exert a thrust force in tangential direction on the flywheel 10. This results in a torque and accordingly in a rotary movement of the flywheel 10 together with the crankshaft 12, which finally starts the motor.

Preferably the outer and/or inner rings 16 and 18 of the flywheel 10 are fabricated of a material having high conductivity, such as iron. In order to further increase the conductivity, it is preferably coated or covered with a material of high conductivity, such as copper, on the surfaces that lie substantially parallel to the coil plane of the stator coils 24. Eddy currents induced in the conductive layer build up a secondary electromagnetic field which, like the primary field, lies perpendicular to the gap plane. This arrangement guarantees an optimal degree of coupling. Alternatively, short-circuited rotor windings (elements 29 in FIG. 1) may be arranged in or on the flywheel—again in such manner that the primary field and the secondary field are optimally linked.

This arrangement achieves a considerable increase of the resulting thrust force. The eddy currents induced in the flywheel are spread in the highly conductive layer or the rotor windings, so that the induced magnetic field is correspondingly greater and leads to a strengthened interaction with the exciter field. Investigations on conventional linear motors have shown that the resulting thrust forces are approximately proportional to the electrical conductivity of the material of the current-conducting rotor layers. Further, heat losses, or so-called eddy current losses, in the flywheel are reduced to a minimum.

In particular, the outer rotating ring 16 of the flywheel 10 is made of iron or steel and coated with copper plate on its two side surfaces facing the stator coils 24. Hereby high eddy currents are induced in the side surfaces and correspondingly high thrust forces. In respect to production technology, it is desirable to construct the flywheel 10 as a circular steel disk and to cover it with a copper plating on the surfaces facing the gap.

A further increase in the thrust force can be achieved through rotor coils 29 (arranged on the flywheel 10 and acted upon with a current (as indicated by broken lines in FIG. 1). In this embodiment, the rotor coils 29 are arranged in such manner that their magnetic field is oriented perpendicular to the gap plane and acted upon in such manner that the fields of the rotor coils 29 and stator coils 24 are maximally reinforced. The field of the rotor coils 29 there can be a unidirectional field or an alternating field adapted to the phases of the field of the stator coils 24. In the last-mentioned case the resulting rotary movement of the flywheel 10 is based above all on the "entrainment" of the field of the rotor coils 29 by the travelling field of the stator coils 24.

In the case of large drive units which require a great starting moment for the starting, the flywheel may be constructed in such manner that it has a T-shaped cross section. In this case, stationary exciter coils which generate the primary field can be arranged both laterally and also radially outside of the flywheel, in such manner that the exciter coils "embrace" the T-shaped end zone of the flywheel, similarly as in the case of high-speed magnetic suspension railway. In this manner there is achieved a strong magnetic coupling between exciter coils and flywheel, with simultaneously compact and sturdy construction.

Alternatively, the exciter coils can be arranged in or on the flywheel and a material of high conductivity or short-circuited windings can be arranged on the stator of the linear motor. In this manner the functions of moved and stationary base elements are simply exchanged in respect to the generation of the primary field and exciter field and secondary and inducted field. That is, the exciter coils on the flywheel are disposed to generate the travelling field, which induces eddy-currents in the stator. The induced currents in interaction with the travelling field exert a thrust force on the flywheel.

One advantage of this arrangement is that it can be flexibly adapted to the dimensions in the motor zone of a motor vehicle. As a consequence of the movement of the traveling field, only the stator or the rotor coil arrangement must span the path of travel. Several alternative executions, therefore, are possible. The stator can extend concentrically around the entire circumference on one or both sides of the flywheel. It may therefore form a ring or double ring. The rotor coils arranged in or on the flywheel may be distributed exclusively in a segment-type section of the flywheel. Alternatively, the stator coils may extend only over a certain angular range and the allocated rotor coils of the flywheel disk may span the full circumference of 360°.

As already stated, in the present example of execution the flywheel 10 is constructed as a rotary vibration eradicator, the annular rubber layer 20 of which elastically connects the inner rotating ring 18 with the outer rotating ring 16—eradicating possible rotary vibrations. If the elastic connection of the two rotating rings 16, 18—as in the embodiment represented—has electrically insulating properties, there is yielded, in addition to the vibration damping, an electrical advantage: the annular currents induced in the outer rotating ring 16 cannot pass over into the inner rotating ring 18, and are concentrated, therefore, on the torque-favorable peripheral zone of the flywheel 10.

Figure 3:
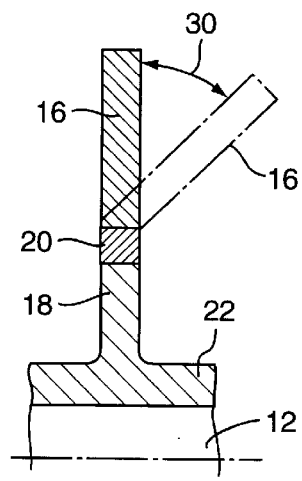
FIG. 3 is a section view analagous to FIG. 2 of a flywheel variant of a starter according to the invention.
Figure 4:
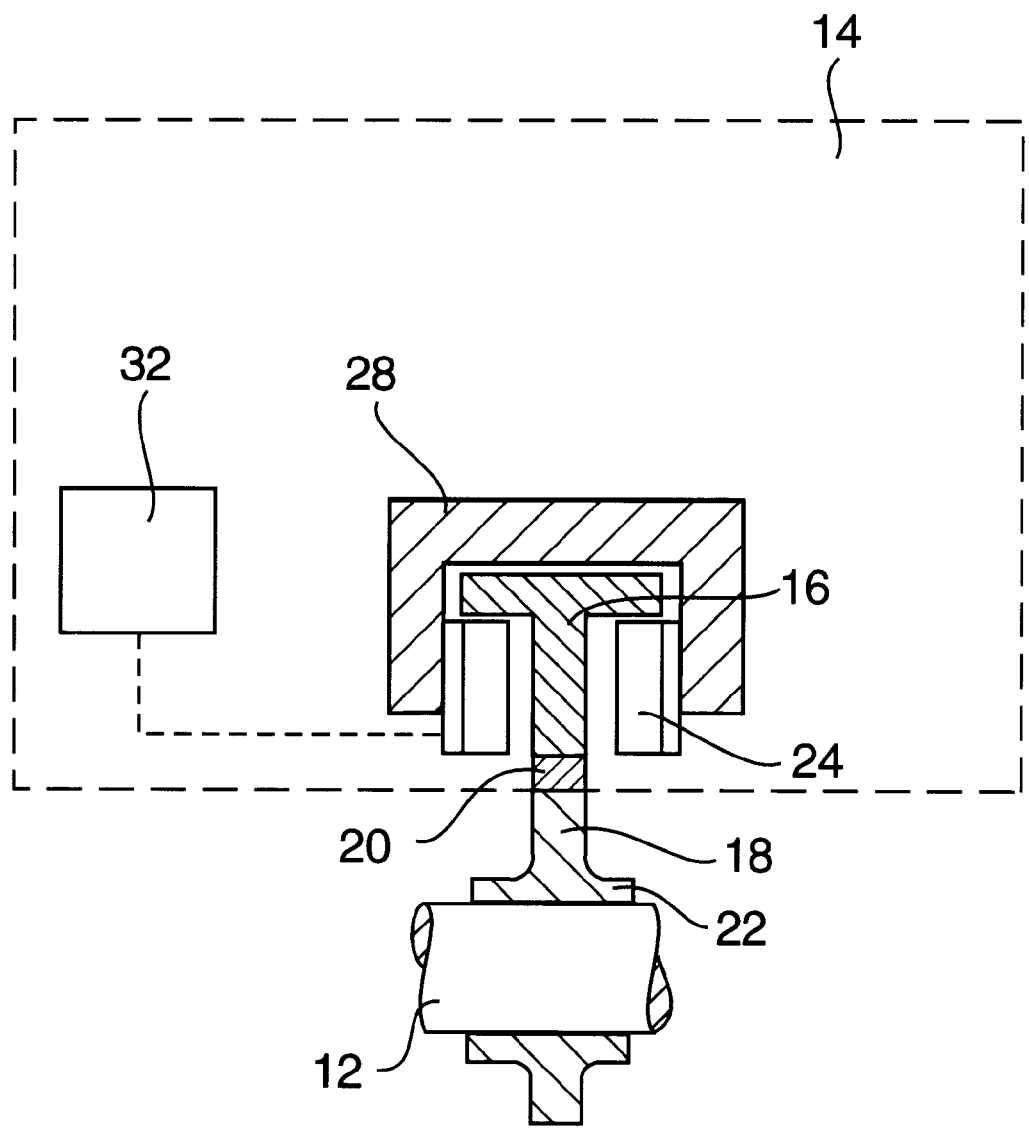
FIG. 4 is a section view analogous to FIG. 2 showing an alternative flywheel configuration in accordance with the invention.

In FIG. 3 there is represented a variant of the flywheel 10. According to this the outer rotating ring 16 of the flywheel 10 is inclined by an angle 30 with respect to the axis of rotation and the flywheel plane. The other components of the starter according to FIGS. 1 and 2 are arranged correspondingly to this orientation. In this manner the starter can be adapted especially simply to the spatial relations in the zone of the flywheel in construction—without in the process impairing its efficiency.

As shown in FIG. 2, the starter includes an electronic circuit 32, which drives the motor vehicle in two types of operation. Upon actuating the starter key, the linear motor 14 operates as a motor for starting an internal combustion engine. That is, appropriate current signals are applied to energize the stator coils 24, as described above. The electronic circuit 32 also includes switching circuitry. Upon completion of a starting operation, the circuit switches the linear motor over to a generator operation. In this operation, the rotor coils 29 are acted upon over slip contacts (not shown) with a current and generate a magnetic field. By reason of the flywheel movement, this field moves relative to the gap plane and induces or generates in the stator coils 24 a voltage. The induced voltage supplies the vehicle with electric energy during operation of the vehicle. The linear motor remains in this mode of operation while the vehicle is operated.

In this manner the starter also assumes the function of a generator known according to the state of the art.

On the other hand, known generators require additional wedged or toothed belts coupled with the crankshaft of the internal-combustion motor. As a result of the invention, a single component is required for the starting process and for supplying current to the motor vehicle. This brings with it a clear reduction in costs.

Accordingly, the invention makes available a starter for drive units, especially internal combustion engines, which makes possible an energy-saving and low-wear starting process with simultaneously reduced production expenditure. The starter can, furthermore, be operated in such a way that it operates as a generator in the starting of a motor, and after the completed start, as a generator. There are several advantages of the linear motor construction of the invention: a simple and sturdy construction with an associated low need of maintenance; a relatively simple regulatability; and a great acceleration during the starting (e.g., thrust forces up to 1000 N).

We claim:

1. A starter for an internal combustion engine having a rotary drive shaft comprising:
    a flywheel coupled to the drive shaft including a passive vibration irradicator for damping interference vibrations of the drive shaft;
    a rotor section located on the flywheel;
    a stator section spaced from the rotor section and together therewith providing an electric motor; and
    a control circuit for providing control signals to the electric motor to induce a traveling magnetic flux linkage between the stator section and rotor section.

2. The starter as in claim 1 wherein the flywheel comprises an inner rotating ring and an outer rotating ring arranged concentric the inner rotating ring and elastically joined with the inner rotating ring such that the flywheel defines the passive vibration irradicator.

3. The starter as in claim 2 wherein the flywheel is inclined with respect to the axis of rotation of the shaft.

4. The starter as in claim 2 wherein the outer rotating ring is inclined with respect to the inner rotating ring.

5. The starter as in claim 1 wherein the stator section includes a plurality of spaced exciter coils disposed proximate to at least one side of the flywheel and adapted to develop a primary traveling magnetic field.

6. The starter as in claim 5 wherein the stator section is separated from the rotor section by an air gap and the flywheel includes a surface coating of material of high conductivity adapted to present a secondary magnetic field perpendicular to a plane defined through the air gap.

7. The starter as in claim 5 wherein the stator section is separated from the rotor section by an air gap and the rotor section is adapted to provide a secondary magnetic field perpendicular to a plane defined through the air gap when conducting current therethrough.

8. The starter as in claim 5 wherein the flywheel has a T-shaped cross section.

9. The starter as in claim 1 further comprising a plurality of exciter coils arranged on the flywheel adapted to develop a primary traveling magnetic field and a plurality of spaced windings arranged on the stator section adapted to provide a secondary magnetic field.

10. The starter as in claim 1 wherein the electric motor comprises a linear electric motor.

* * * * *